April 6, 1965     W. V. KRINSKY     3,176,774
HELICOPTER DRIVE CONTROL
Filed July 24, 1963     3 Sheets-Sheet 1

William V. Krinsky
INVENTOR.

BY
*Attorneys*

April 6, 1965 W. V. KRINSKY 3,176,774
HELICOPTER DRIVE CONTROL
Filed July 24, 1963 3 Sheets-Sheet 3

William V. Krinsky
INVENTOR.

United States Patent Office

3,176,774
Patented Apr. 6, 1965

3,176,774
HELICOPTER DRIVE CONTROL
William V. Krinsky, 320 Montauk Ave.,
New London, Conn.
Filed July 24, 1963, Ser. No. 297,246
3 Claims. (Cl. 170—135.22)

This invention relates to a rotor drive arrangement for helicopter types of aircrafts and more particularly, to a directional and speed control arrangement for the main lift propeller and tail propeller of a helicopter whereby the speed and maneuverability of the aircraft is improved.

It is therefore a primary object of the present invention to provide a propeller rotor drive arrangement for helicopters by means of which the speed and maneuverability of the helicopter is improved.

An additional object of the present invention is to provide a propeller rotor control arrangement whereby the propeller rotor inclination may be adjusted 360° about a rotor drive axis carried by the aircraft air frame.

A further object of the present invention is to provide an adjustable rotor control for the main lifting propeller and tail propeller of a helicopter whereby said propellers may be cooperatively adjusted for both directional and speed variations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
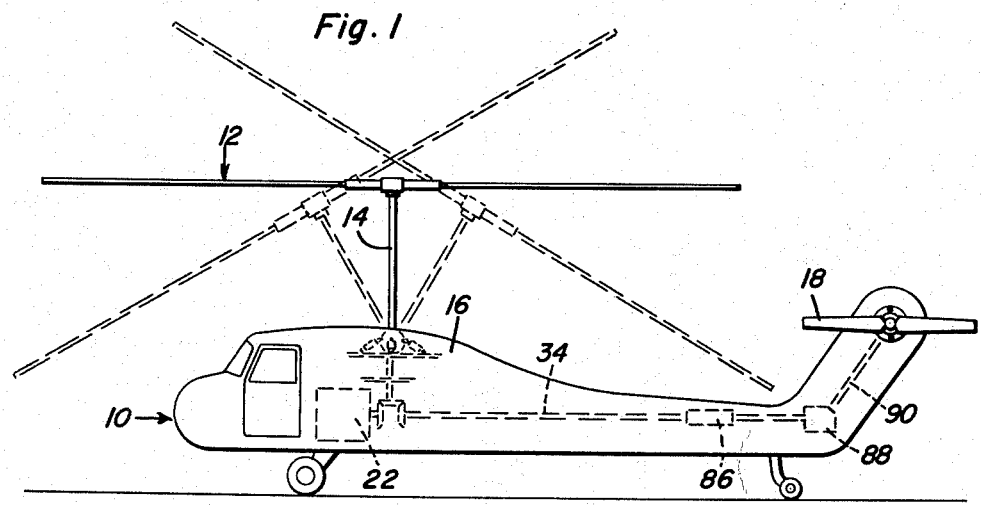
FIGURE 1 is a side elevational view of one typical helicopter having the rotor drive arrangement of the present invention.
Figure 2:
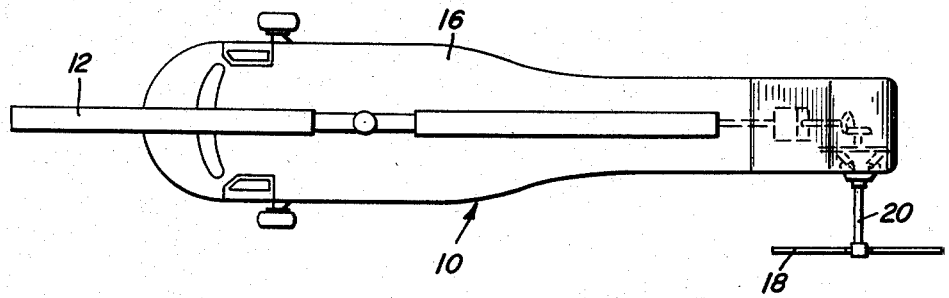
FIGURE 2 is a top plan view of the helicopter illustrated in FIGURE 1.

Referring now to the drawings in detail, it will be observed from FIGURES 1 and 2, that a helicopter generally referred to by the reference numeral 10 is provided with a main lift propeller assembly generally referred to by reference numeral 12 mounted by a rotor shaft 14 which extends vertically upwardly from the helicopter air frame 16 and may be adjusted to different inclinations from the vertical position as shown by dotted line in FIGURE 1. The direction controlling tail propeller 18 is also mounted at the rear end of the air frame 16 by means of the rotor shaft 20 which extends generally in a horizontal plane perpendicular to the longitudinal axis of the air frame 16. The inclination of the rotor shaft 20 may also be varied or adjusted as indicated with respect to the rotor shaft 14 of the main lift propeller 12. Both the main lift propeller 12 and the tail propeller 18 may therefore be driven by an engine 22 located within the helicopter air frame and drivingly connected to the rotor shafts.

Figure 3:
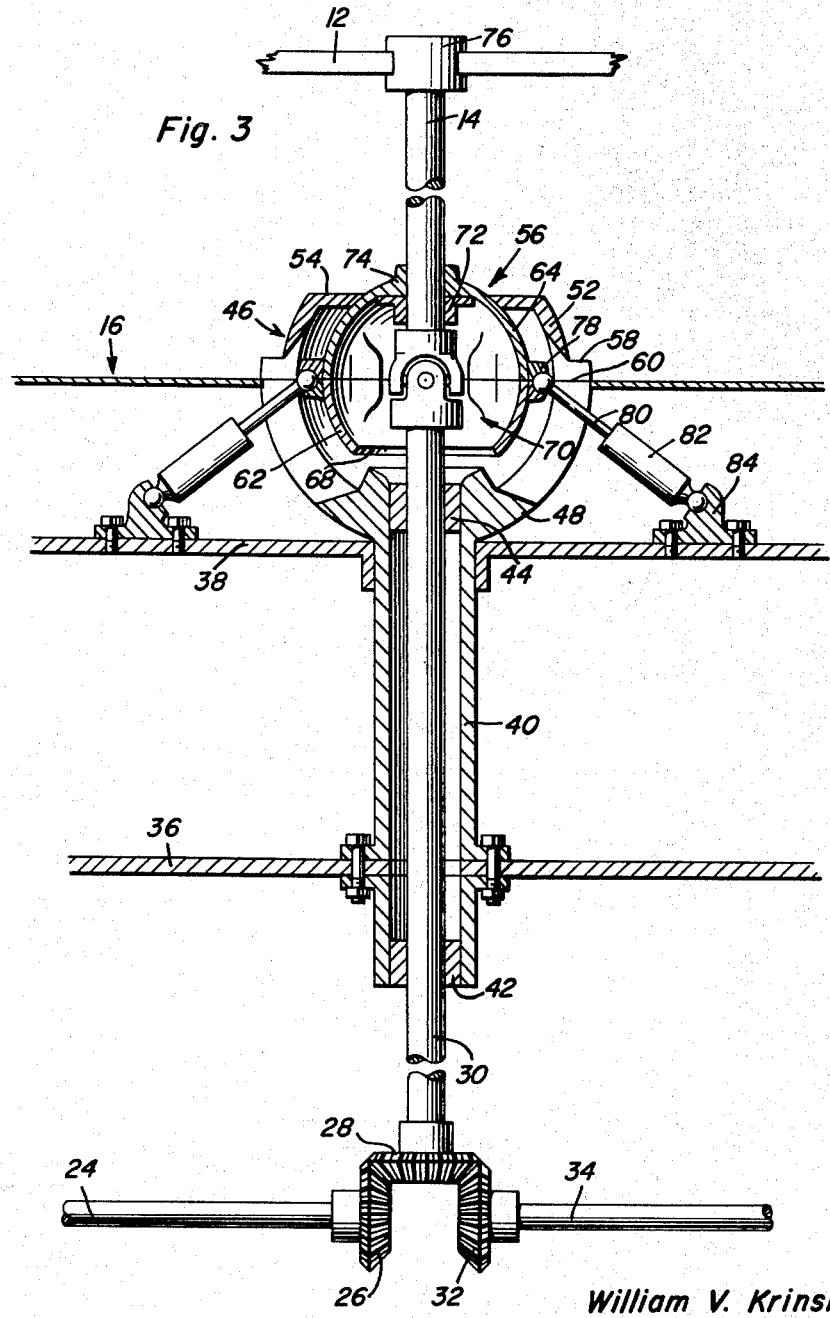
FIGURE 3 is an enlarged partial sectional view of the rotor drive arrangement for the main lifting propeller of the helicopter.

Referring now to FIGURE 3 in particular, it will be observed that the engine shaft 24 suitably supported within the air frame 16 is provided at one end thereof, with a drive bevel gear 26. Meshing with the drive bevel gear 26 is a driven bevel gear 28 connected to the lower end of a drive shaft 30 rotatably supported by the air frame for rotation about a vertical axis fixed with respect to the air frame. The driven bevel gear 28 in turn meshes with the bevel gear 32 connected to a forward end of a power transfer shaft 34 also suitably supported within the air frame and extending rearwardly for driving connection to the tail propeller assembly.

Figure 4:
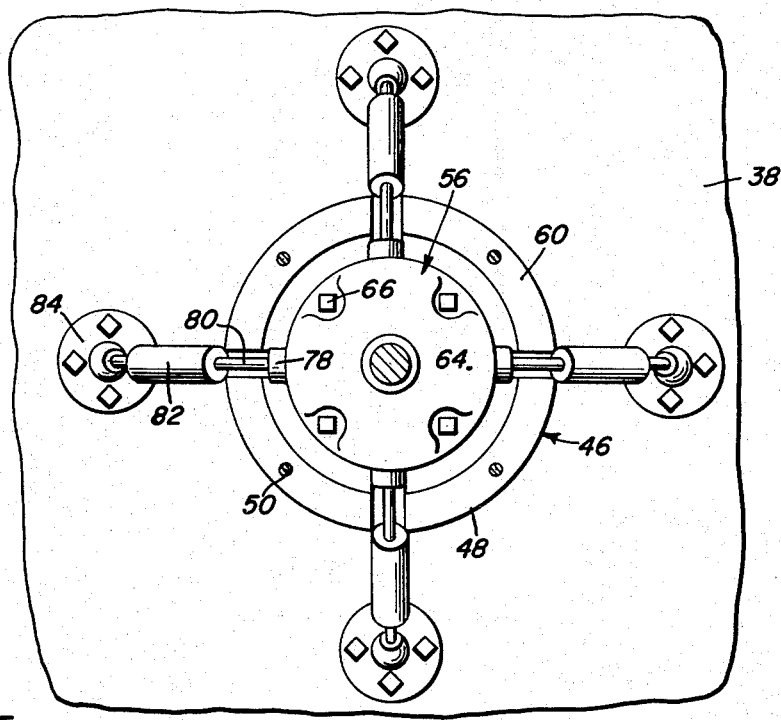
FIGURE 4 is a top plan view of the rotor support and control arrangement illustrated in FIGURE 3.

The air frame 16 may be provided with vertically spaced frame members 36 and 38 to which a tubular journal casing 40 is connected so as to rotatably mount the drive shaft 30 about the fixed vertical axis by means of the space bearings 42 and 44. Connected to the upper end of the journal casing 40, is a spherical socket assembly generally referred to by reference numeral 46. The socket assembly includes a lower hemispherical socket section 48 integrally connected to the upper end of the journal casing tube 40. Secured to the socket section 48, by means of a plurality of circumferentially spaced fastener assemblies 50 as more clearly seen in FIGURE 4, is an upper socket section 52 exposed above the outer skin of the airframe 16 as shown in FIGURE 3. The upper socket section 52 includes a flat chordal wall 54 having an opening through which a portion of an inner ball assembly 56 is exposed. Also, the socket section 52 includes an annular flange portion 58 which is adapted to rest upon and be secured to the upper annular surface 60 of the lower socket section 48 by means of the fastener assemblies 50.

The ball assembly 56 is therefore adapted to be rotatably mounted within the socket assembly 46 for universal movement or angular displacement of the rotor shaft 14 within all planes radially intersecting the fixed vertical axis of the drive shaft 30, disposed 360° thereabout. The ball assembly 56 therefore includes a lower, hollow hemispherical section 62 secured to an upper hollow hemispherical section 64 by means of a plurality of circumferentially spaced fastener assemblies 66 as more clearly seen in FIGURE 4. The lower hemispherical section 62 is provided with a chordal slotted opening 68 through which the drive shaft 30 extends and by means of which angular displacement of the ball assembly with respect to the drive shaft is accommodated within limits. Connected to the upper projecting end of the drive shaft 30 and centrally aligned with the center of the ball assembly 56, is a universal joint 70, the universal joint establishing a rotational connection between the drive shaft 30 and the rotor shaft 14 for any adjusted inclination thereof. The universal joint 70 will also be completely enclosed within the ball assembly 56 so as to provide protective lubricating facilities therefor. Also, the upper hemispherical section 64 is provided with a bearing portion 72 through which the upper hemispherical section provides journal support for the rotor shaft 14 extending from the universal joint 70 outwardly through the bearing retaining formation 74 exposed from the socket assembly 46. It will therefore be apparent, that the universal joint 70 and the bearing 72 are enclosed by both the inner ball assembly 56 and the outer socket assembly 46.

With continued reference to FIGURES 3 and 4, it will be observed that facilities are provided for adjusting the inclination of the rotor shaft 14 and propeller blades connected thereto by the propeller hub 76. Accordingly, each of the hemispherical sections of the inner ball assembly are provided with equal circumferentially spaced ball joint socket formations 78 adapted to receive the ball joint ends of piston rods 80 that extend out of hydraulic power operated cylinder devices 82 disposed in diverging relation to the socket assembly for support thereof below the inner ball assembly 56. Four such hydraulic cylinder devices are illustrated in the present embodiment of the invention whereby extension and retraction of the piston rod 80 under control of a suitable hydraulic control system, will be operative to angularly displace the inner ball assembly 56 and rotor shaft 14 carried thereby to its desired position. Each of the cylinder devices is therefore provided with a universal anchoring socket member 84 fastened to the air frame member 38 for universally mounting the cylinder devices 82 in surrounding relation to the socket section 48 protectively below the outer skin of the airframe 16. It will therefore be appreciated, that by supplying fluid pressure to selected cylinder devices and bleeding pressure from others, the main lifting propeller blades may be positioned at some inclined angle to the vertical and in any direction with respect to said vertical to as to control both the speed and direction of the aircraft. In cooperation with the foregoing speed and directional control achieved through the main lift propeller, adjustment of the tail propeller 18 may be effected in a manner and by structure similar to that described with respect to the main lift propeller rotor.

Figure 5:
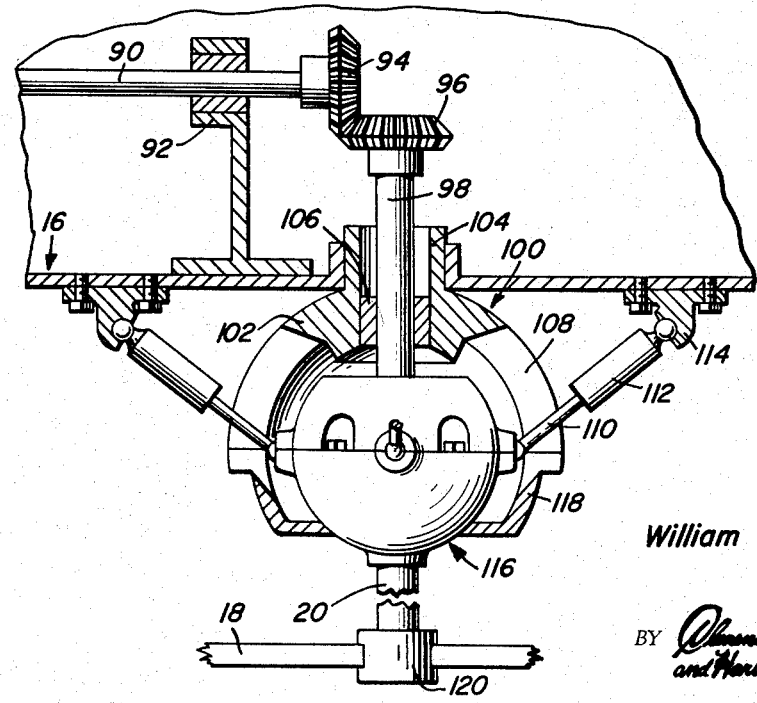
FIGURE 5 is an enlarged partial sectional view of the tail rotor drive and control arrangement.

Referring therefore to FIGURES 1, 2 and 5, it will be observed that the power transfer shaft 34 is connected by a spline coupling 86 to a transfer gear 88 which in turn transmits power to the transfer shaft 90 which is drivingly connected to the tail propeller 18. A suitable support 92 is therefore provided in the air frame 16 for the shaft 90, the terminal end of which is provided with a bevel gear 94 that meshes with the driven bevel gear 96 connected to the input end of the tail shaft 98 which is rotatably mounted about an axis fixed to the air frame 16 disposed perpendicular to the vertical axis through the drive shaft 20, in a horizontal plane. Accordingly, a socket assembly 100 is fixed to the air frame 16 by means of which the tail shaft 98 is journaled about the fixed horizontal axis. The socket assembly 100 is similar in construction to the socket assembly 46 described with respect to the main lift rotor assembly and hence includes a socket section 102 fixed to the air frame and provided with the tubular portion 104 through which the tail shaft 98 extends and in which a bearing 106 is mounted for journaling the tail shaft 98. The socket section 102, like the socket section 48, is provided with arcuate slots 108 circumferentially spaced thereabout and through which the piston rod 110 extends, said piston rod being associated with hydraulic cylinder devices 112 mounted on the air frame by the pivotal socket anchoring members 114. Accordingly, four hydraulic cylinder devices 112 may be associated with the socket assembly 100 similar to the arrangement described with respect to FIGURE 4 for the purpose of angularly adjusting the position of an inner ball assembly 116 which is similar in construction to the inner ball assembly 56, the ball assembly 116 having a chordal portion exposed through the section 118 of the socket assembly 100 which is similar in construction to the socket section 52 of the socket assembly 46 described with repect to FIGURE 3. Thus, the tail rotor shaft 20 extends out of the inner ball assembly 116 and is connected to the propeller hub 120 of the tail propeller 18. Angular adjustment of the tail propeller from the horizontal axis of the tail shaft 98 may therefore be accomplished through the hydraulic cylinder devices 112 in a manner similar to that described with respect to angular adjustment of the main lift propeller rotor shaft 14 by the hydraulic cylinder devices 82. It will therefore be apparent, that angular adjustment of the tail rotor shaft 20 in cooperation with the adjustment of the main lift propeller rotor 14, will enable one to augment the speed of the helicopter if so desired or increase its maneuverability.

From the foregoing description, the operation and utility of the hydraulically controlled helicopter rotor drive arrangement will be apparent. The arrangement described in addition to enabling a greater degree of speed and directional control to be exercised through adjustment of the main lift propeller and tail propeller, also provides a protected and improved adjustable mounting arrangement for the rotor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an aircraft having a main lifting rotor driven by a drive shaft rotatably mounted by an air frame about a fixed vertical axis thereon, and a tail rotor driven by a tail shaft geared to the drive shaft and rotatable about a fixed horizontal axis on the air frame disposed perpendicular to said fixed vertical axis; directional control means for respectively varying the inclination of the main lifting rotor and the tail rotor with respect to rotational planes perpendicular to said fixed vertical and horizontal axes comprising, journal means mounted on said air frame for rotatably supporting each of said drive and tail shafts about said fixed vertical and horizontal axes, socket means fixed to each of said journal means centrally aligned with projecting ends of said drive and tail shafts, ball means enclosed within said socket means for universal movement in all planes intersecting said fixed axes, bearing means mounted internally of said ball means for rotatably mounting said rotors about adjustable rotor axes carried by each of said ball means, universal joint means enclosed within each of said ball means for connecting the projecting ends of said drive and tail shafts to the main lifting rotor and the tail rotor respectively, and power operated means anchored to the air frame in surrounding relation to the socket means and operatively connected to said ball means within the socket means for varying the inclination of both of said rotors to control the speed and direction of the air frames, said power operated means comprising a plurality of hydraulic cylinder devices pivotally anchored to said air frame in equal circumferentially spaced relation about each of said fixed axes, and piston means extending in converging relation from each of said cylinder devices through circumferentially spaced slots in said socket means for pivotal connection to each of said ball means.

2. The combination of claim 1, wherein each of said ball means comprises, a pair of hollow hemispherical sections, one of said sections having a chordal opening through which one of said drive and tail shafts extends, the other of said sections having a bearing portion exposed through the socket means to rotatably carry one of said rotors therewith.

3. In an aircraft having an airframe, a lifting rotor and a drive gear mounted for rotation about a fixed axis on the airframe, means for drivingly connecting said drive gear to the rotor and angularly adjusting the position of the rotor relative to the fixed axis comprising, a journal member fixedly mounted by the airframe and having a socket portion, a drive shaft connected to said drive gear and rotatably mounted by the journal member about said fixed axis, a universal joint disposed within the socket portion and interconnecting the drive shaft and the rotor, a spherical shell mounted for universal movement within said socket portion and enclosing said universal joint, bearing means mounted by the shell for rotatably mounting the rotor about an angularly adjustable axis, said socket portion being provided with a plurality of circumferentially spaced slots, a plurality of circumferentially spaced power operated devices extending through said slots in diverging relation to each other, means anchoring said power operated devices to the airframe in surrounding relation to the socket portion, and means pivotally connecting each of said power operated devices to the shell within the socket portion for angularly adjusting the position of the rotor, said socket portion being radially spaced from the shell for accommodating movement of the pivotal connecting means with the shell and a chordal wall connected to the socket portion having an opening guiding said universal movement of the shell relative to the socket portion.

References Cited by the Examiner

UNITED STATES PATENTS

| | | | |
|---|---|---|---|
| 1,458,844 | 6/23 | Perkins. | |
| 2,216,080 | 9/40 | Johnson | 170—160.27 X |
| 2,415,999 | 2/47 | Frasher | 170—135.26 X |
| 2,491,191 | 12/49 | Maillard | 170—135.22 |
| 2,518,623 | 8/50 | Judge | 170—160.26 X |
| 2,806,662 | 9/57 | Yonkers | 170—160.27 X |
| 2,835,458 | 5/58 | Dorman | 244—17 X |
| 2,932,353 | 4/60 | Armstrong | 170—160.27 X |
| 3,082,826 | 3/63 | Doman | 170—160.27 X |

FOREIGN PATENTS

| | | |
|---|---|---|
| 573,127 | 11/45 | Great Britain. |
| 605,561 | 7/48 | Great Britain. |

JULIUS E. WEST, *Primary Examiner.*